[22.]

FRANKLIN FAIRBANKS.
Improvement in Brakes for Vehicles.

No. 118,598.  Patented Aug. 29, 1871.

Witnesses.  
S. W. Piper  
L. N. Möller

Franklin Fairbanks  
by his attorney.  
R. M. Eddy

UNITED STATES PATENT OFFICE.

FRANKLIN FAIRBANKS, OF ST. JOHNSBURY, VERMONT.

IMPROVEMENT IN BRAKES FOR VEHICLES.

Specification forming part of Letters Patent No. 118,598, dated August 29, 1871.

*To all whom it may concern:*

Be it known that I, FRANKLIN FAIRBANKS, of St. Johnsbury, of the county of Caledonia, of the State of Vermont, have invented a new and useful Improvement in Brakes for Carriages; and do hereby declare the same to be fully described in the following specification and represented in the accompanying drawing, of which—

Figure 1:
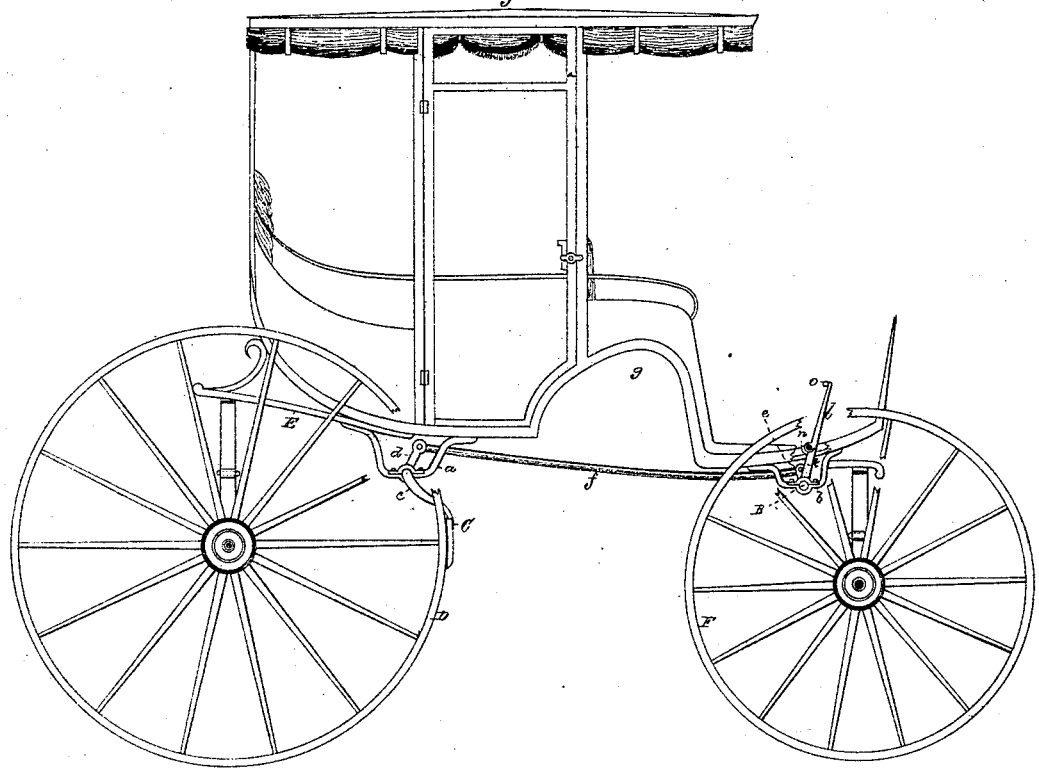
Figures 2, 3:
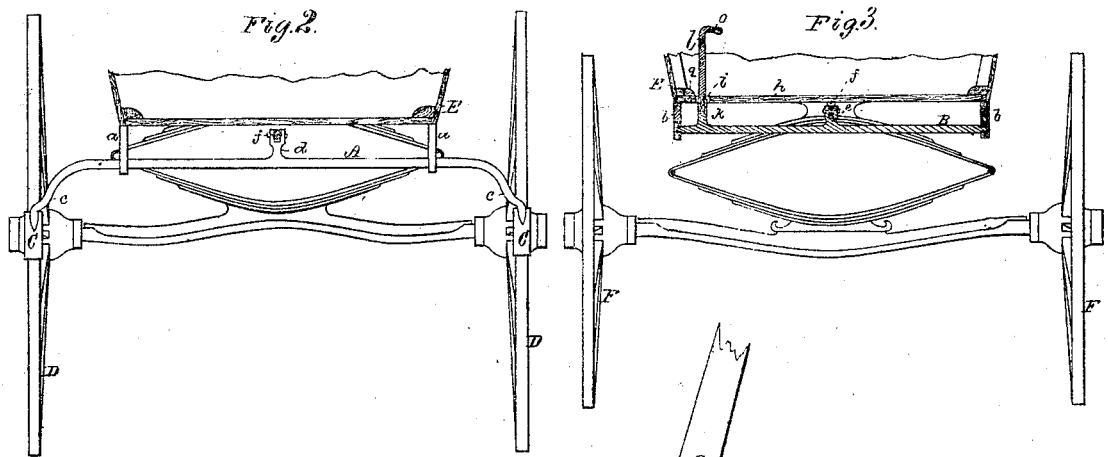
Figure 4:
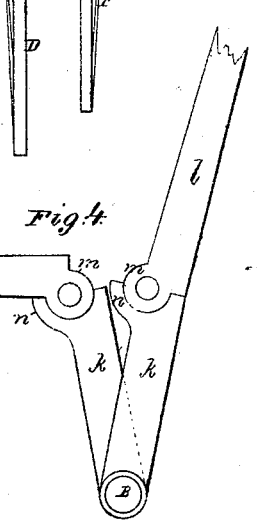

Figure 1 denotes a side elevation of a four-wheel carriage with my improved brake apparatus applied to it. Fig. 2 is a transverse section, showing the brakes and their carrying shaft, and the arrangement of such relatively to the rear wheels. Fig. 3 is another transverse section taken through the axis of the pedal-shaft. Fig. 4 is an illustration of the pedal in its two extreme positions.

In applying my invention to a carriage-body, E, I arrange underneath the same, in manner as shown, and supported in hangers $a\ a\ b\ b$, two parallel and horizontal shafts, A B. The rearmost shaft I provide with curved arms $c\ c$, projecting from it, as represented, and fastened, respectively, to two brakes, C C, arranged to work against the peripheries of the rear set of wheels D D. From each shaft, at its middle, there projects upward a short arm, as shown at $d$ or $e$, there being jointed to such arms at their upper ends a connecting-rod, $f$, which, if desirable, may be arched where passing across the wheel-space $g$ below the front seat of the carriage-body, the purpose of so arching the rod being to enable either of the front wheels F F to pass through it without interfering with it while the carriage may be in the act of being turned in a curve of very short radius. Generally speaking, I prefer to have the connection-rod straight or nearly so. From the front shaft B there extends upward, through a slot, $i$, in the floor $h$ of the carriage-body, an arm, $k$, having a pedal, $l$, connected with it at its upper end by a knuckle or rule-joint, as shown at $m$ in Fig. 4. This rule-joint I provide with an auxiliary stop or abutment, $n$, arranged as shown in Fig. 4, it being to support the pedal when turned downward. It enables the pedal, when pressed downward by the foot, or when down by its weight and leverage, to maintain the brakes out of contact with the wheels. The pedal I usually provide with a foot-rest or handle, $o$, extended from it in manner as shown, its purpose being to enable the pedal to be manipulated by the hand of the driver of the vehicle, or worked by his foot applied directly to such part $o$. In order to have the pedal, when turned down upon the floor of the carriage, out of the way of the feet of the driver, I arrange such pedal close to the side frame-bar $q$ of the flooring.

It will be observed that when this brake apparatus is in operation the power exerted to throw or maintain the brakes against the wheels acts by tension or draft on the connecting-rod, and, therefore, can be made very effective. The pedal, by folding down toward and upon the floor, becomes out of the way of the driver when he may be either stepping into or out of the carriage, and it and the auxiliary stop $n$ answers, as before described, to effect or aid in effecting the movement of the brakes away from the rear wheels, and also to keep them out of action thereon at such times as it may be desirable so to do.

In order to actuate the brakes the driver has only to raise up the pedal and press it forward either by his hand or foot, the latter being generally employed for the purpose.

I claim—

The combination of the two shafts, A B, the brakes C C, the arms $d\ e\ k$, the connecting-rod $f$, and the pedal $l$, attached to the arm $k$ by a rule-joint or its equivalent, provided or not with the stop $n$ or its equivalent, the brakes being connected to the rear shaft A by arms $c\ c$, and the two shafts A B having their journals supported on hangers $a\ a\ b\ b$ extending from the carriage-body, all essentially as shown.

FRANKLIN FAIRBANKS.

Witnesses:
WM. P. FAIRBANKS,
E. D. BLODGETT.